(12) United States Patent
Bakhir et al.

(10) Patent No.: US 7,897,023 B2
(45) Date of Patent: Mar. 1, 2011

(54) DEVICE FOR PRODUCING ANODIC OXIDATON PRODUCTS OF AN ALKALI OR ALKALI-EARTH METAL CHLORIDE SOLUTION

(76) Inventors: Vitold Mikhailovich Bakhir, Moscow (RU); Yury Georgievich Zadorozhny, Moscow (RU)

( * ) Notice: Subject to any disclaimer, the term of this patent is extended or adjusted under 35 U.S.C. 154(b) by 1012 days.

(21) Appl. No.: 11/663,707
(22) PCT Filed: Jun. 2, 2005
(86) PCT No.: PCT/RU2005/000301

§ 371 (c)(1),
(2), (4) Date: Mar. 23, 2007

(87) PCT Pub. No.: WO2006/038831

PCT Pub. Date: Apr. 13, 2006

(65) Prior Publication Data

US 2007/0261954 A1  Nov. 15, 2007

(30) Foreign Application Priority Data

Oct. 1, 2004  (RU) .............................. 2004128832

(51) Int. Cl.
C25C 3/00 (2006.01)
C25C 3/02 (2006.01)
C25D 17/00 (2006.01)

(52) U.S. Cl. .................. 204/263; 204/257; 204/258; 204/295; 204/275.1; 204/278

(58) Field of Classification Search .................. 204/257, 204/258, 263, 275.1, 278, 295
See application file for complete search history.

(56) References Cited

U.S. PATENT DOCUMENTS 5,635,040 A  6/1997  Bakhir et al.
6,004,439 A * 12/1999  Bakhir et al. ............... 204/260

FOREIGN PATENT DOCUMENTS

| GB | 2 253 860 A | 9/1992 |
| JP | 2-274889 | 11/1990 |
| RU | 2 088 693 C1 | 8/1997 |
| RU | 2 176 989 C1 | 12/2001 |

OTHER PUBLICATIONS

Esp@cenet.com abstract of JP 2-274889 dated Nov. 9, 1990.

* cited by examiner

Primary Examiner — Harry D Wilkins, III
Assistant Examiner — Zulmariam Mendez
(74) Attorney, Agent, or Firm — Ladas & Parry LLP

(57) ABSTRACT

The invention relates to chemical engineering, in particular to devices for electrolyzing aqueous solutions of alkali or alkali-earth metal chlorides and for obtaining gaseous electrolytic products such as chlorine and oxygen. It can be used for water purifying and disinfecting processes and for electrochemically producing some chemical products. The inventive device includes at least one electrochemical reactor (1) comprising from 2 to 16 electrochemical cells. Lines for supplying and discharging cathode and anode chambers are embodied in the form of pipelines having an inner diameter equal to or less than 0.5 of the interelectrode distance and lengths which are equal to or greater than $2 L_d$, wherein the interelectrode distance is an anode-to-cathode distance and $L_d$ is the cathode length. A manifold for supplying an initial solution (10), a lower manifold of the cathode circulation circuit (15), a heat exchanger (18), an upper manifold of the cathode circulation circuit (14) and a manifold for collecting gaseous products of the anodic chamber cells (13) are arranged along the same vertical axis. The upper manifold of the cathode circulating circuit (14) is mounted at a height not less than then the distance equal to $L_d$ from the cathode chamber output. The number of the inputs and outputs of the manifolds corresponds to the number of cells in the reactor, and said inputs and outputs are arranged symmetrically with respect to the vertical axis of symmetry of the manifold.

3 Claims, 5 Drawing Sheets

DEVICE FOR PRODUCING ANODIC OXIDATON PRODUCTS OF AN ALKALI OR ALKALI-EARTH METAL CHLORIDE SOLUTION

FIELD OF THE INVENTION

The invention relates to chemical engineering, in particular to devices for electrolyzing aqueous solutions of alkali or alkali-earth metal chlorides and for obtaining gaseous products of electrolysis such as chlorine and oxygen and can be used for cleaning and disinfecting water and for electrochemical production of chemical products.

BACKGROUND OF THE INVENTION

In applied electro-chemistry electrolytic cells of different designs are widely used for preparing products of anode oxidation of chloride solutions, in particular electrolytic cells with coaxial cylindrical electrodes and a diaphragm between them (see, for example Japanese patent JP 02274889 A, C25B 9/00, 1989).

Module electrolytic are more perspective as they provide for required productivity by connecting required number of electrolytic cells, decreased cost of designing and production of electrolytic sections of selected productivity, unification of assemblies and parts, decreased time for mounting and repairing such electrolytic sections (see, for example patent U.S. Pat. No. 5,635,040 C02F 1/461, Mar. 6, 1997).

A device for producing anodic oxidation products of an alkali metal chloride solutions is known in the prior art. The device comprises at least one electrolytic cell with coaxial cylindrical electrodes divided with a diaphragm into an anode and cathode chambers, an anode and cathode circulation circuits each provided with a gas separation volume, a pipeline for supplying alkali metal chloride solution connected to the anode circulation circuit and the system for maintaining increased pressure in the anode circuit. A gas separation volume outlet of the anode circuit can be connected to a mixer for producing oxidation products not only in gas state but also as an aqueous solution (see patent RU 2088693, C25B 9/00, 1997).

The known device is configured according to module concept. It is easy to be mounted for different production level depending on required products to be obtained in gas or solution state. However this device is relatively bulky, has two circulation circuits. Moreover, the size and height of the gas separation volumes should follow additional requirements in relation to the cells resulting in increase of device size. Materials for pipes and assemblies forming the anode circulation circuit must also follow special requirements since during operation they are subjected to continuous action of extremely chemically hostile gas-liquid medium flowing at a high speed. Presence of two circulation circuits with many hydraulic joints also increases the risk of depressurization.

The closest device in technology and technical result is a device for obtaining products of alkali or alkaline-earth chloride solution anode oxidation. The device comprises at least one electrochemical reactor composed of a few modular electrochemical cells each including coaxial cylindrical electrodes, an inner hollow anode and an outer cathode, and a diaphragm between them. The diaphragm is made of a ceramic based on zirconium, aluminum and yttrium oxides. The electrodes are arranged in lower and upper mounting units so that a hydraulically isolated anode chamber and a cathode chamber are formed; the chambers having an inlet in the lower mounting unit and an outlet in the upper mounting unit, wherein the inlet and outlet of the anode chamber are in communication with the anode hollow and the anode has perforations arranged in the upper and lower parts as well as evenly along the length of the anode. The cells of the reactor or reactors are of one type, the anode and cathode are at an interelectrode distance of 8-10 mm, wherein:

d=1.5-2.3 interelectrode distance
    D=3.0-4.3 interelectrode distance
    $L_d$=25-40 interelectrode distance
    $\delta$=0.15-0.35 interelectrode distance and $S_k \geq S_a$, wherein
    d is the outer diameter of the anode;
    D is the inner diameter of the cathode;
    $L_d$ is the length of the cathode;
    $\delta$ is the thickness of diaphragm side walls;
    $S_k$ is the cross section area of the cathode chamber; and
    $S_a$ is the cross section area of the anode chamber.

The cells are provided with input lines to cathode and anode chambers and output lines from cathode and anode chambers; the lines are connected to the lower and upper mounting units correspondingly. The cells of the reactor are arranged at one level and hydraulically connected in parallel. The device further comprises a supply line with a pump for supplying initial solution under pressure, a manifold of initial solution connected to the initial solution supply line and the input lines to the anode chambers of the cells, a manifold for gaseous products of anode oxidation connected to output lines from the anode chambers of the cells, a cathode circulation circuit connected to the input and output lines of the cell cathode chambers, and a separation tank for separating gas escaping during electrolysis, an upstream pressure controller connected to the manifold of anode oxidation gaseous products and an output line for gaseous products from the anode chamber connected to the upstream pressure controller, a controller of chloride solution level in the anode chambers (see RU 2176989). This technical solution has been chosen by the inventors as a prototype.

Use of the solution according to the prototype allows deleting the anode circulation circuit thereby making the device simpler and cheaper.

However the known solution has some disadvantages. The cells of a reactor or reactors work in different hydraulic conditions though arranged at one level due to different length of the hydraulic line for each cell of the reactor relative to common places of connections to the device hydraulic system. It results in irregular thermal conditions of cells, different chemical compositions of anode oxidation products obtained in cells of the same reactor and irregular wear of the electrocatalytic coating of anodes in cells. What is more, the device has relatively low productivity of cells in the amount of anode oxidation products compared to calculated value due to high heating. In the known device there is high risk of premature wear of cell electrodes due to leakage current through electrolyte solutions filling the hydraulic lines combining cells into a reactor.

SUMMARY OF THE INVENTION

The technical result of the present invention is increasing productivity of the device, decreasing power consumption, increasing reliability and life time of continuous operations as well as decreasing the size and making the device simpler.

The result is achieved by using a device for obtaining products of alkali or alkaline-earth chloride solution anode oxidation, the device comprising at least one electrochemical reactor composed of a few modular electrochemical modular cells, each including a coaxial cylindrical hollow anode, an outer cylindrical cathode, and a diaphragm made of ceramic on the basis of zirconium, aluminum and yttrium oxides between the electrodes. The electrodes are fixed in lower and upper mounting units so that hydraulically isolated anode and cathode chambers are formed; the chambers having an inlet in the lower mounting unit and an outlet in the upper mounting unit, wherein the inlet and outlet of the anode chamber are in communication with the anode hollow, and the anode has perforations arranged in the upper and lower parts as well as evenly along the length of the anode. The cells of the reactor or reactors are of one type, the anode and cathode are at an interelectrode distance of 8-10 mm, wherein:

d=1.5-2.3 interelectrode distance
D=3.0-4.3 interelectrode distance
$L_d$=25-40 interelectrode distance $\delta$=0.15-0.35 interelectrode distance and $S_k \geq S_a$, wherein:
d is the outer diameter of the anode;
D is the inner diameter of the cathode;
$L_d$ is the length of the cathode;
$\delta$ is the thickness of diaphragm side walls;
$S_k$ is the cross-section area of the cathode chamber; and
$S_a$ is the cross-section area of the anode chamber.

The cells are provided with input lines to cathode and anode chambers and output lines from cathode and anode chambers, the lines being connected to the lower and upper mounting units correspondingly. The cells of the reactor are arranged at one level and hydraulically connected in parallel. The device further comprises a supply line with a pump for supplying initial solution under pressure, a manifold of initial solution connected to the initial solution supply line and the input lines to the anode chambers of the cells, a manifold for gaseous products of anode oxidation connected to output lines from the anode chambers of the cells, a cathode circulation circuit connected to the input and output lines of the cathode chambers of the cells, and a separation tank for separating gas escaping during electrolysis comprising a means for separating gas, an upstream pressure controller connected to the manifold of anode oxidation gaseous products, and an output line for gaseous products from the anode chamber connected to the upstream pressure controller, a controller of chloride solution level in the anode chambers, a controller of chloride solution level in the anode chambers. A reactor or reactors of the device each comprises from 2 to 16 electrochemical cells. The manifold of initial solution supply and a manifold for collecting gaseous products from anode chambers having the number of inlets and outlets corresponding to the number of cells in the reactor; said manifolds are vertical their inlets and outlets are arranged symmetrically relative to their vertical axis. The means for separating gas is in the form of an upper vertical manifold. The device further comprises a lower vertical manifold of the cathode circulation circuit and a vertical heat exchanger located between the upper and lower manifolds of the cathode circulation circuit, wherein the inlet and outlet of the heat exchanger are connected to correspondingly to the upper and lower manifolds of the cathode circulation circuit. These manifolds also have the number of inlets and outlets equal to the number of cells in the reactor, and their inlets and outlets are arranged symmetrically relative to their vertical axis. The manifold of initial solution supply, the lower manifold of the cathode circulation circuit, the heat exchanger, the upper manifolds of the cathode circulation circuit and the manifold for collecting gaseous products from cell anode chambers are arranged along one vertical axis, wherein the upper manifolds of the cathode circulation circuit is placed at a height not less than $L_d$ from the cathode chamber output, the manifold for collecting gaseous products from cell anode chambers are placed above or below the upper manifolds of the cathode circulation circuit, the input lines and output lines of cathode and anode chambers are in the form of pipes with inner diameter of not more that 0.5 interelectrode distance and equal length of not less than 2 $L_d$, wherein reactor cells are arranged symmetrically relative to the vertical axis along which the upper and lower manifolds of the cathode circulation circuit are arranged with the heat exchanger between them.

The diaphragms in the cells of the device are of microfiltration type.

When the device is used in the processes of water conditioning for producing a mixture of oxidants, the sizes of structural elements calculated according to the formula are optimal, in particular, the length of each cell is 380 mm, wherein if the cathode length is 350 mm, the length of diaphragm is 300 mm, the length of the anode is 290 mm, the thickness of diaphragm walls is 2.5 mm, the interelectrode distance is 10 mm, and the upper manifolds of the cathode circulation circuit is placed at a height not less that 300 mm from the outlet of the cathode chamber; the inlets and outlets of the cathode chambers are connected correspondingly to the lower and upper manifolds of the cathode circulation circuit with pipes having the inner diameter of 5 mm and the length of not less than 600 mm, and the inlets and outlets of the anode chambers are connected correspondingly to the unit of initial solution supply and to the manifold for collecting gaseous products from cell anode chambers with pipes having the inner diameter of 5 mm and the length of not less than 800 mm.

It is essential to have cells of the sizes specified in the restrictive parts of the claims. Design of mounting assemblies is not specific. For examples, cells according to RU 2176989 or other cells with above sizes can be used. The mounting parts for arranging electrodes and diaphragms can be of different type, for example bushings and/or gaskets of other forms.

If there are from 2 to 16 electrochemical cells in a reactor or reactors of the device, the reactors can be arranged symmetrically relative to the vertical axis and thereby providing similar conditions for their operations. The device can word with one reactor but its performance will be lower and the cost of product will be higher due to ineffective use of equipment, i.e. such device will not provide for achieving the claimed technical result. If the number of cells is higher than 16, such elements as the supply system, manifolds, heat exchanger must be increased in volume. It results in higher expense and lower effectiveness of the reactor.

Using the means for separating gas of the cathode circulation circuit in the form of the upper manifold, the vertical heat exchanger and the lower vertical manifold of the cathode circulation circuit provide for effective circulation system in the cathode circulation circuit without additional cost, due to gas lift and heat energy released in the reactor cells. It is essential that the heat exchanger is vertical and its design is chosen for particular conditions of the device operations. What is more, the vertical position on the heat exchanger provides for identical operations of all cells.

The manifold for collecting gaseous products from anode chambers is also vertical for providing identical conditions for cells.

The manifolds (the upper and lower manifolds of the cathode circulation circuit, the manifold of initial solution supply to cell anode chambers and the manifold for collecting gaseous products from an anode chamber) have the number of inlets corresponding to the number of cells in a reactor and being arranged in symmetrical positions for maintaining the same hydraulic mode in all cells. If positioning of inlets in the manifold is different, it is impossible to maintain the same conditions in working cells, and the cells operate irregularly, heat balance becomes different in different cells, and conditions for circulation change too, productivity decreases, and obtained products differ in their chemical compositions.

If the number of cells is smaller, for example up to six, it is advisable to use cylindrical shape because in such case it is easier to arrange the inlets symmetrically, and the risk of dead zone formation in manifolds is decreased. When the number of cells is from six to sixteen, the manifolds can be of regular polygon cross-section with the number of facets corresponding to the number of cells.

Volume and height of the manifolds depends on the required conditions, in particular on cell productivity and their number in a reactor or in reactors of the device.

The upper manifold of the cathode circulation circuit is arranged at a height from the cathode chamber outlet that is not less than $L_d$ since there is no efficient circulation of catholyte if the height is less. Moreover, in such case the catholyte should remain in the upper manifold longer to provide required level of degassing thereby changing to the worse heat exchange and increasing risk of excessive hydrostatic pressure c electrolyte in cathode chambers and deteriorating electrolysis. The manifold for collecting gaseous products from cell anode chambers can be placed above or below the upper manifold of the cathode circulation circuit depending on the general requirements of device set up.

As a result of the inlet and outlet of cathode chamber of each cell being connected correspondingly to the lower and upper manifolds of the cathode circulation circuit through pipes having inner diameter not more than 0.5 interelectrode distance and equal length not less than $2 L_d$, the required conditions for cell operations, level of catholyte circulation in the cathode circulation circuit, regular supply of initial solution in the anode chamber, prevention of anolyte and gaseous electrolysis product ejection from the anode chamber are maintained. What is more, reliability and safety of the operations are increased since the risk of leaks is sharply decreased. If pipes of bigger inner diameters and shorter lengths are used, the defects appear as described above.

It is preferable to use a microfiltration diaphragm in the cells since such diaphragm provides for required current through the cell and at the same time for obtaining electrolysis products of required purity.

The inventors called the device according to the present invention an "AKVAKHLOR" device. Productivity of the device may be reflected in the name, for example a device producing 500 g of oxidants per hour may be called "AKVA-KHLOR-500".

DESCRIPTION OF THE PREFERRED EMBODIMENTS

Figure 1:
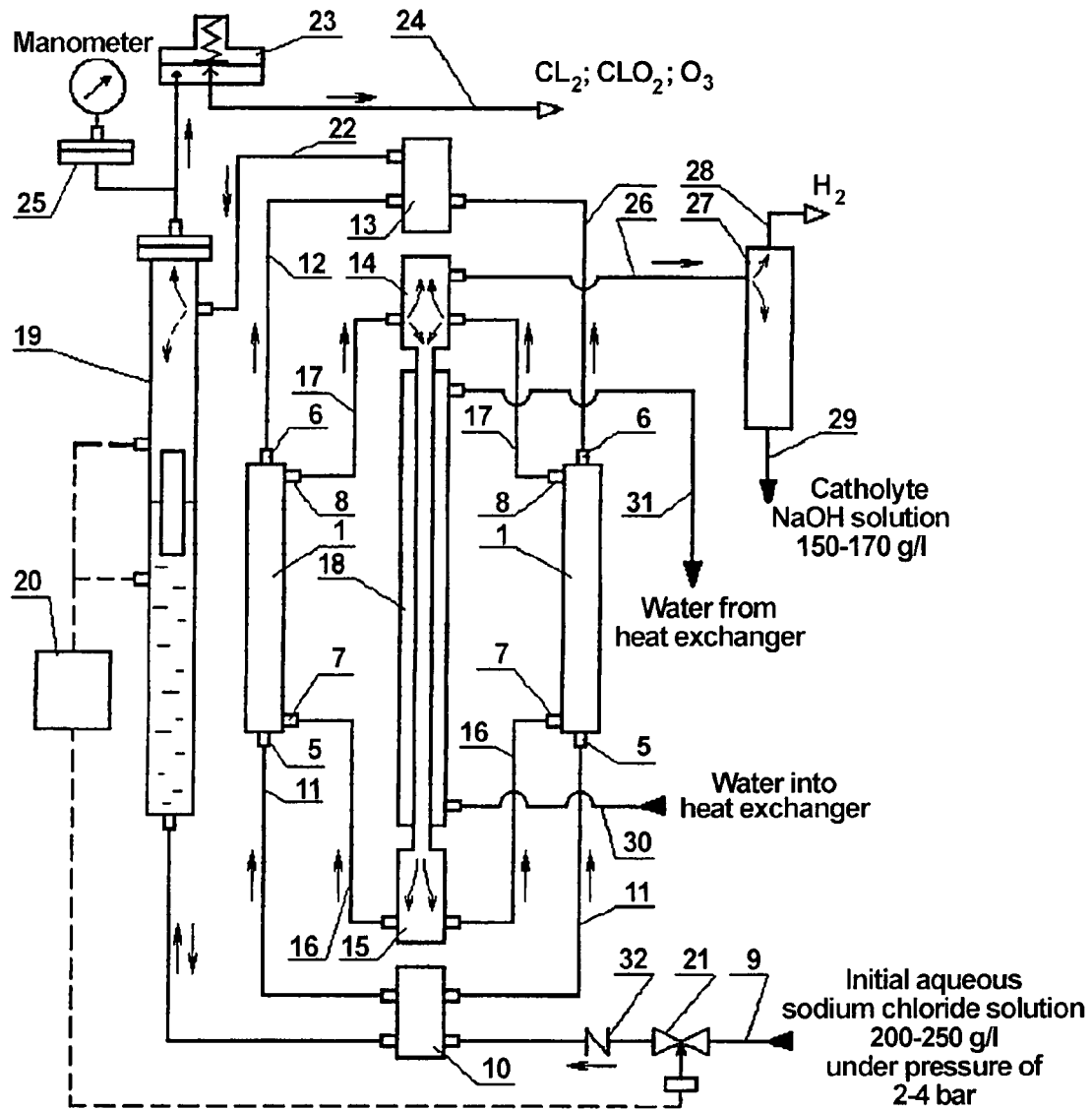
FIG. 1 presents a diagram of the device for producing anodic oxidation products of an alkali or alkali-earth metal chloride solution.

The device (FIG. 1) comprises a reactor consisting of a few modular electrochemical cells 1.

Figure 2:
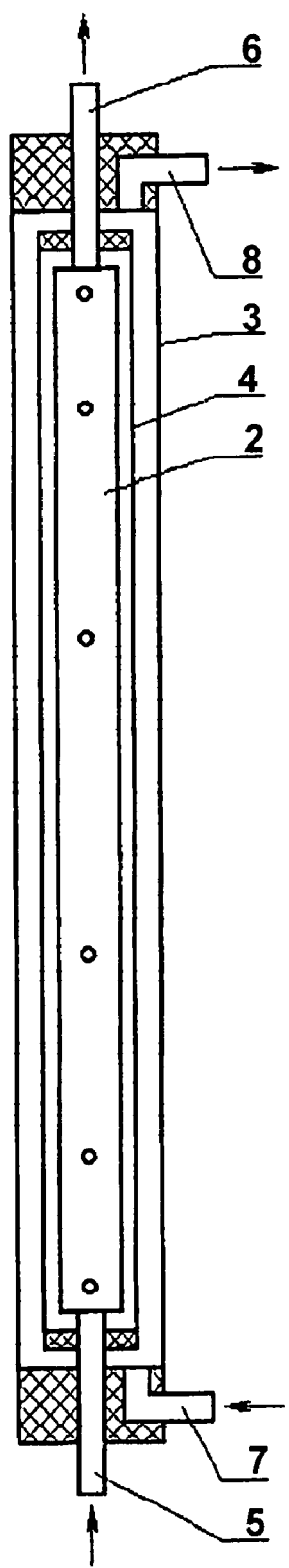
FIG. 2 is a diagram of a cell used in the device.

The modular electrochemical cell (FIG. 2) comprises an inner hollow vertical cylindrical anode 2 and an outer vertical cylindrical cathode 3. A diaphragm 4 made of ceramic based on zirconium oxide is placed coaxially between electrodes 2 and 3 and fixed at the ends of electrodes 2 and 3 with the help of mounting units (shown schematically). An inlet 5 and an outlet 6 of the anode chamber arranged at the ends of electrode 2 and inlet 7 and an outlet 8 of the cathode chamber are also shown in FIG. 2.

Anode 2 has perforations in the upper and lower parts and additional holes along the whole length.

The device (FIG. 1) comprises a supply line for supplying initial solution 9 under pressure, a manifold for supplying initial solution 10 arranged vertically, lines for delivering initial solution 11 to anode chambers connected to collector 10 and inlet 5 of the anode chamber, lines for removing gaseous products from anode chamber 12 connected to outlets of anode chambers 6 and manifold 13 for collecting gaseous products from anode chamber. The device comprises also a cathode circulation circuit formed by the upper 14 and lower 15 manifolds of the cathode circulation circuit, lines of cathode chamber supply of cells 16 connected to inlets of cathode chambers 7, lines of removal from cathode chambers 17 connected to outlets of cathode chambers 8, and a vertical heat exchanger 18 placed between manifolds 14 and 15.

The device also comprises a controller of anolyte level 19 and a control unit 20 connected by a communication line with a control valve 21, a line for removal of gaseous products from the anode chamber of the device 22 connected to the output of manifold 13 and the upper part of the controller of anolyte level 19, an upstream pressure controller of anode gases 23 with a line of removal gaseous products of the device 24. A manometer 25 is located between controller of anolyte level 19 and pressure controller 23.

The device comprises a line for removal gaseous products from cathode chamber of the device 26 connected to the output of manifold 14 and tank 27 for collecting entrained anolyte. Tank 27 is connected to the line for removing gas 28 and a line for outputting catholyte 29. What is more, the device comprises a line for supplying 30 cooling agent—water—to heat exchanger 18 and a line for removing water 31 from heat exchanger 18.

The device also comprises a check valve 32 which maintains elevated pressure in the anode circuit together with the pressure controller 23. Manometer 25 is used for visual indication of the pressure in the anode circuit.

Figure 3:
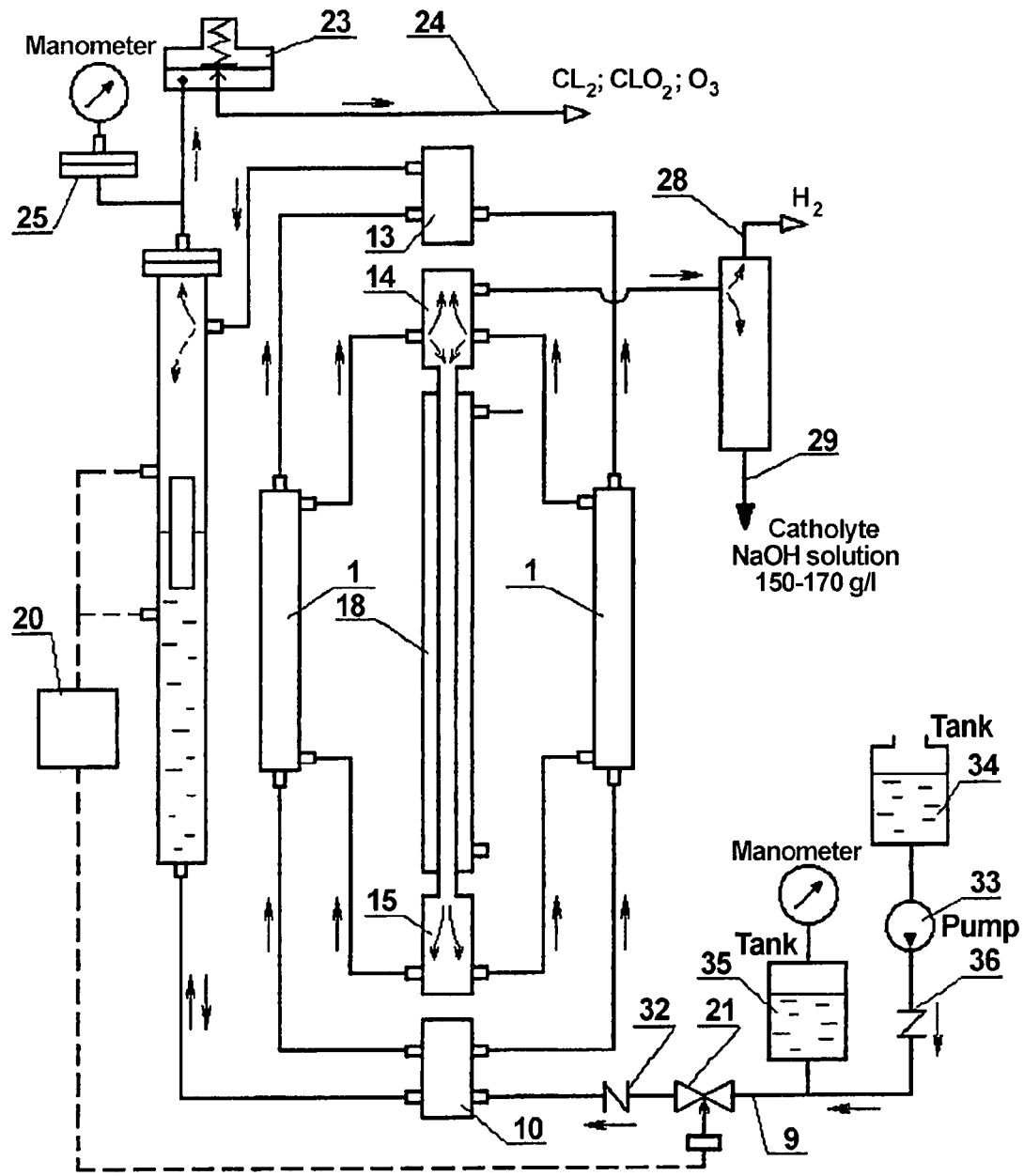
FIGS. 3-5 present diagrams of the device for producing anodic oxidation products of an alkali or alkali-earth metal chloride solution in another technological set-up.

Initial solution can be delivered along line 9 with the help of a means for increasing pressure 33 in the form of a pump (FIG. 3). In such case the device can be provided with a tank for the initial solution or for dissolving a salt 34 and a buffer tank 35 with a manometer and an additional check valve 36.

Figure 4:
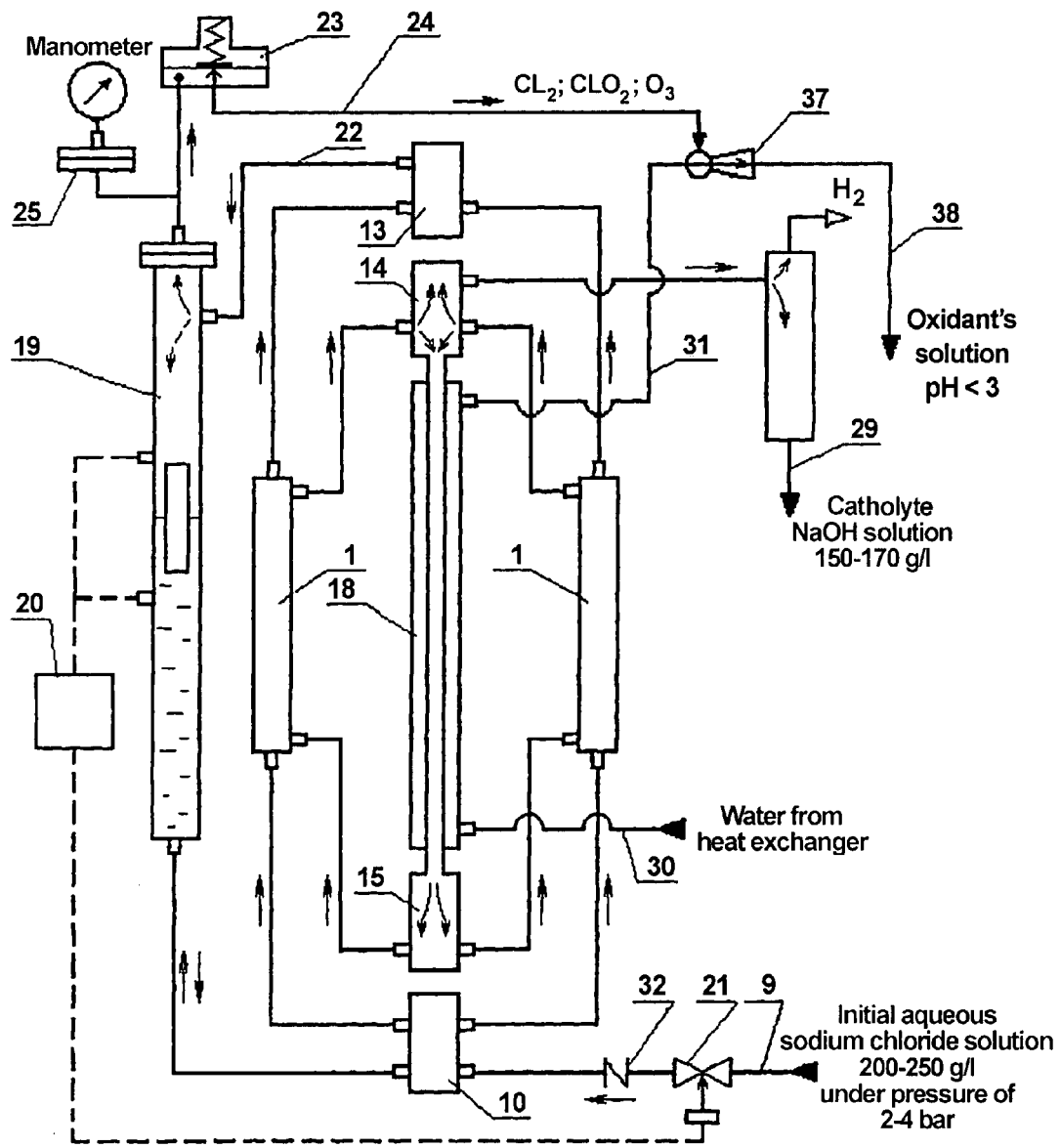

When the target product is required in the form of an aqueous solution, a mixer 37 can be provided (FIG. 4), for example in the form of an ejector, wherein the ejector is connected with line 24 for removing the target gaseous product and equipped with a line 38 for removing the target product in the form of oxidant's solutions.

Figure 5:
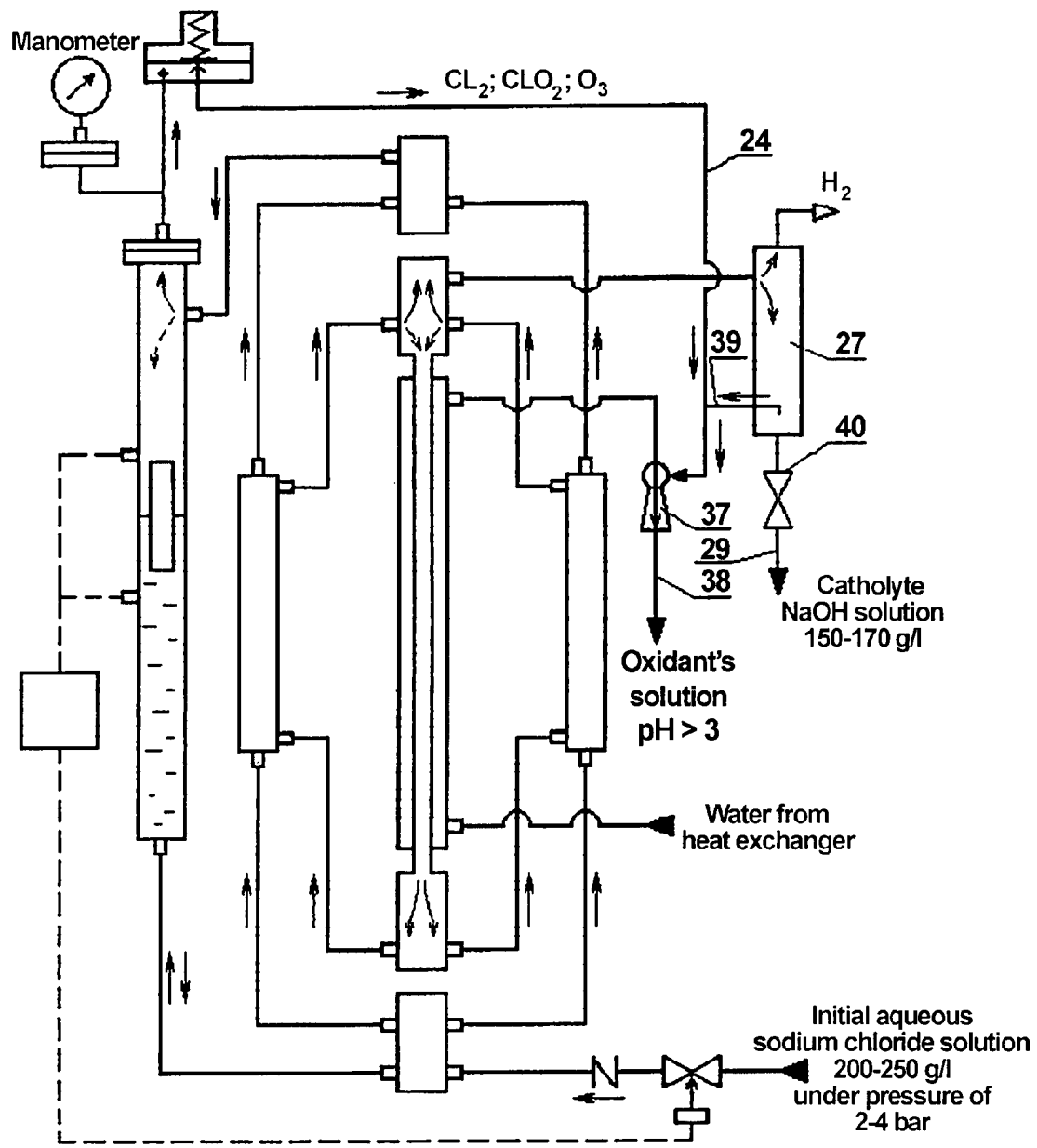

If a particular value of pH of produced oxidant aqueous solution is required, the device can be equipped with further line 39 connecting the lower part of tank 27 with line 24 and mixer 37 (FIG. 5) for controlling pH of the solution. In such case it is preferable to arrange a control valve 40 on line 29 for the removal of catolyte from tank 27.

The devise operates as described below.

A concentrated alkali or alkali-earth metal chloride solution under pressure is supplied to the device through line 9 (FIG. 1) and open valve 21. The solution is first delivered to manifold 10, and then it is evenly distributed to anode chambers of cells 1 at the rate sufficient to maintain steady level of anolyte in cells 1. The level is controlled with the help of manometer 25 and automatically maintained by controller of anolyte level in the cells 19 connected to control unit 20 with control valve 21.

After energizing electrodes 2 and 3 (FIG. 2), intensive electrolysis gas emission, mainly of chlorine, begins in an anode chamber at the outer surface of the hollow cylindrical anode. Anolyte passes into the inner volume of anode 2 through the perforations of the hollow cylindrical anode 2; it is freed of gas bubbles and thereby provides intensive inner circulation of anolyte. Gas, mainly chlorine, is removed through outlet 6 at the upper part of hollow cylindrical anode 2. It enters the manifold for collecting gaseous products from the anodic chamber 13. The gaseous products of electrolysis from manifold 13 pass through line 22 to the upper part of controller of anolyte level in the anode chambers 19 for separating entrained anolyte, and gaseous products of electrolysis are removed from the anode space through pressure controller 23 and line 24. Obtained anode gas can be directed to a consumer or delivered to gas-liquid mixer 37 (FIG. 4) where the gas is mixed with water coming from the cooling circuit of heat exchanger 18. The target product is delivered to a consumer through line 38 as an aqueous oxidant's solutions.

Cathode chambers of cells 1 are filled with water (or initial solution) before switching on. After electrodes 2 and 3 are energized, electrolysis gas, which is hydrogen, begins to liberate at the inner surface of cathode 3 and enters the solution in the cathode chamber (catholyte). The apparent density of the catholyte decreases due to gas bubbles in it and its heating in the process of cell operation, and catholyte moves upwards. Catholyte with gas bubbles enters manifold 14 through output line 17. In manifold 14 catholyte is freed of electrolysis gases, mainly hydrogen, and flows to vertical heat exchanger 18 for cooling. Cooling agent, water, is fed counterflow into the outer circuit of heat exchanger 18 through line 31. Cooled cathiolyte flows from heat exchanger 18 into manifold 15. The density of the catholyte increases and it returns for further processing through input lines 16 and being uniformly distributed among the cathode chambers of cells 1. Hydrogen containing vapor and particles of entrained catholyte is directed into tank 27 from manifold 14 through line 26. In tank 27 drops of catholyte coalesce, and purified hydrogen is removed from the process cycle through line 28. Catholyte accumulated in tank 27 can be used for producing reagents for preliminary chemical treatment of water: coagulants, flocculants. It can also be used for cleaning equipment (tanks, filters). The catholyte having essential concentration of sodium hydroxide (up to 150 g/l) can also be evaporated for obtaining commercial solid hydrate of sodium. Catholyte has significant pH, and in some cases it is fed in mixer 37 (FIG. 5) for adjusting pH of the aqueous oxidant's solution.

Initial solution for feeding in the device through line 9 can be prepared at the place by dissolving solid salt in tank 34 (FIG. 3) and delivered through line 9 using pump 33 creating excess pressure. Buffer tank 35 can be also used to secure continuous operation of the devise.

The present invention is illustrated with the following examples which however do not limit the variants of its implementation.

In all examples a cell according to patent RU 2176989, which inventors named by abbreviation PEM-7, was used. The anode and cathode of the cell were arranged at the interelectrode distance=10 mm. The outer diameter of the anode d was 16 mm (d=1.6 interelectrode distance), the inner diameter D of the cathode was 36 mm (D=3.6 interelectrode distance), the cathode length $L_d$ was 350 mm ($L_d$=35 interelectrode distance), the diaphragm wall thickness was 2 mm ($\delta$=0.2 interelectrode distance), the cross-section area of the cathode chamber was 4 cm², the cross-section area of the anode chamber $S_a$ was 2.5 cm², i.e. $S_k \geq S_a$. The ultrafiltration diaphragm was made of ceramic of the following composition: 70% zirconium oxide, 27% aluminum oxide and 3% yttrium oxide. There were 9 holes at a distance of 30 mm from each other arranged along a spiral on the whole surface of the anode. The surface of the titanium anode had OPTA cover. The inlet and outlet of the anode chamber were made of grade BT1-00 titanium; the seals of the diaphragm were made of grade F-4 fluorocarbon polymer.

EXAMPLE 1

An "AKVAKHLOR-500" device according to the present invention having an electrochemical reactor with sixteen PEM-7 electrochemical cells was used. The supplying and removing pipes of the cathode circulation circuit having the length of 700 mm were made of polyvinylchloride, the pipes for feeding initial solution into the anode chambers and for removing gaseous electrolysis products having the length of 800 mm were made of fluorocarbon polymer. All pipes had the inner diameter of 5 mm. The manifolds had a cylindrical shape; each of the manifolds had two inputs arranged symmetrically relative to the vertical axis. The heat exchanger of the device was of "tube-in-tube" type, wherein the upper manifold of the cathode circulation circuit was mounted at the height of 350 mm.

An "AKVAKHLOR-500" device industrially manufactured according to the prototype of patent RU 2176989 was also provided with sixteen PEM-7 modular electrochemical cells. The initial solution having concentration of 200 g/l was used for preparing a mixture of oxidants (mainly chlorine) by electrolysis of the sodium chloride aqueous solution. During the process the excess pressure in the anode chamber was maintained at 3 bar.

The obtained results are shown in Table 1

TABLE 1

| Parameters | AKVAKHLOR Device | |
| --- | --- | --- |
| | Prototype | Inventive |
| Sodium chloride concentration in initial solution, g/l | 200 | 200 |
| Electric current through one electrochemical cell, A | 30 | 30 |
| Voltage of one electrochemical cell, V | 3 | 2.5 |
| Effective current, A | 480 | 480 |
| Power consumption, W | 1440 | 1200 |
| Productivity of oxidants, g/h | 550 | 620 |
| Consumption of sodium chloride for synthesis of 1 g of oxidants, g | 1.85 | 1.75 |
| Electricity rate for synthesis of oxidants, W · h/g | 2.6 | 1.93 |
| Productivity relative to purified drinking water (1 mg/l), l/h | 550000 | 620000 |
| Overall dimensions of electrochemical unit of the device, cm | 90 × 36 × 120 | 40 × 50 × 170 |
| Weight of electrochemical unit, kg | 38 | 32 |

It follows from the results shown in the table that the device according to the invention has higher productivity and lower energy consumption. At the same time the devise according to the invention has smaller size and weight.

EXAMPLE 2

The same devises were tested for stability of obtained results in time.

After 2000 hours of work the productivity of the prototype device decreases by 10-30% due to deterioration of diaphragm seals in the cells of the prototype device whereas the device according to the invention maintains initial parameters.

INDUSTRIAL APPLICABILITY

The present invention provides for higher productivity of the device, lower energy consumption required for operations, higher reliability and life time, simpler structure, and smaller size. Use of the device for producing anode oxidation products allows widening the range of such products including the target products in the form of gas mixture or in the form of aqueous solution, at the same time cutting down the consumption of chemicals.

The invention claimed is:

1. A device for producing anodic oxidation products of alkali or alkaline-earth chloride solution, the device comprising at least one electrochemical reactor composed of a few modular electrochemical cells, each of the cells including a coaxial cylindrical hollow anode, an outer cylindrical cathode, and a diaphragm made of ceramic on the basis of zirconium, aluminum and yttrium oxides and arranged between the electrodes; the electrodes are fixed in lower and upper mounting units so that hydraulically isolated anode and cathode chambers are formed; the chambers having inlets in the lower mounting unit and outlets in the upper mounting unit, wherein the inlet and outlet of the anode chamber are in communication with the anode hollow, and the anode has perforations arranged in the upper and lower parts as well as evenly along the length of the anode; the cells of the reactor or reactors are of one type, the anode and cathode are at an interelectrode distance of 8-10 mm, wherein:

$d$=1.5-2.3 interelectrode distance
$D$=3.0-4.3 interelectrode distance
$L_d$=25-40 interelectrode distance
$\delta$=0.15-0.35 interelectrode distance
and $S_k \geq S_a$, wherein:

$d$ is the outer diameter of the anode;
$D$ is the inner diameter of the cathode;
$L_d$ is the length of the cathode;
$\delta$ is the thickness of diaphragm side walls;
$S_k$ is the cross-section area of the cathode chamber; and
$S_a$ is the cross-section area of the anode chamber;

the cells are provided with input lines to cathode and anode chambers and output lines from cathode and anode chambers, the lines being connected to the lower and upper mounting units correspondingly, the cells of the reactor are arranged at one level and hydraulically connected in parallel; the device further comprises a supply line with a pump for supplying initial solution under pressure; a manifold of initial solution connected to the initial solution supply line and the input lines to the anode chambers of the cells; a manifold for gaseous products of anode oxidation connected to output lines from the anode chambers of the cells; a cathode circulation circuit connected to the input and output lines of the cathode chambers of the cells and provided with a means for gas separation; an upstream pressure controller connected to the manifold of anode oxidation gaseous products; and an output line for gaseous products from the anode chamber connected to the upstream pressure controller; a controller of chloride solution level in the anode chambers, characterized in that the reactor or reactors of the device each comprises from 2 to 16 electrochemical cells; the manifold for initial solution supply and the manifold for collecting gaseous products from anode chambers are vertical and have the number of inlets and outlets corresponding to the number of cells in the reactor, said inlets and outlets are arranged symmetrically relative to the their vertical axis of symmetry; the means for separating gas of the cathode circulation circuit is in the form of an upper vertical manifold; and the device further comprises a lower vertical manifold of the cathode circulation circuit and the vertical heat exchanger located between the upper and lower manifolds of the cathode circulation circuit, wherein the inlet and outlet of the heat exchanger are connected correspondingly to the upper and lower manifolds of the cathode circulation circuit; these manifolds also have the number of inlets and outlets equal to the number of cells in the reactor, and their inlets and outlets are arranged symmetrically relative to their vertical axis; the manifold of initial solution supply, the lower manifold of the cathode circulation circuit, the heat exchanger, the upper manifolds of the cathode circulation circuit and the manifold for collecting gaseous products from cell anode chambers are arranged along one vertical axis, wherein the upper manifold of the cathode circulation circuit is placed at a height not less than $L_d$ from the cathode chamber output, the manifold for collecting gaseous products from cell anode chambers are placed above or below the upper manifold of the cathode circulation circuit, the input lines and output lines of cathode and anode chambers are in the form of pipes with inner diameter of not more than 0.5 interelectrode distance and equal length of not less than 2 $L_d$, wherein reactor cells are arranged symmetrically relative to the vertical axis along which the upper and lower manifolds of the cathode circulation circuit are arranged with the heat exchanger between them.

2. A device for producing anodic oxidation products of alkali or alkaline-earth chloride solution according to claim 1, characterized in that the length of each cell is 380 mm, wherein the length of the cathode is 350 mm, the length of the diaphragm is 300 mm, the length of the anode is 290 mm, the thickness of the diaphragm walls is 2.5 mm, the interelectrode distance is 10 mm, and the upper manifold of the cathode circulation circuit is fixed at the height not less than 300 mm from the output of the cathode chamber, the inlet and outlet of the cathode chamber of each cell are connected correspondingly to the lower and upper manifolds of the cathode circulation circuit through pipes having an inner diameter of 5 mm and a length of not less than 600 mm, and the inlet and outlet of the anode chamber are connected correspondingly to the unit of initial solution supply and to the manifold for collecting gaseous products from cell anode chambers through pipes having a diameter of 5 mm and a length not less than 800 mm.

3. A device for producing anodic oxidation products of alkali or alkaline-earth chloride solution according to claim 1, characterized in that the diaphragm of a modular electrochemical cell is a microfiltering diaphragm.

* * * * *